US007421460B2

(12) United States Patent
Chigusa et al.

(10) Patent No.: US 7,421,460 B2
(45) Date of Patent: Sep. 2, 2008

(54) METHOD FOR DETERMINING EXECUTION OF BACKUP ON A DATABASE

(75) Inventors: Kentaro Chigusa, Yokohama (JP);
Kenichi Chadani, Yokohama (JP);
Morihiro Iwata, Tama (JP)

(73) Assignee: Hitachi, Ltd., Tokyo (JP)

( * ) Notice: Subject to any disclaimer, the term of this patent is extended or adjusted under 35 U.S.C. 154(b) by 1004 days.

(21) Appl. No.: 10/428,591

(22) Filed: May 1, 2003

(65) Prior Publication Data

US 2004/0098423 A1 May 20, 2004

(30) Foreign Application Priority Data

Nov. 20, 2002 (JP) .............................. 2002-335928

(51) Int. Cl.
*G06F 12/00* (2006.01)
*G06F 17/30* (2006.01)
*G06F 7/02* (2006.01)

(52) U.S. Cl. ..................................................... 707/204
(58) Field of Classification Search ....................... None
See application file for complete search history.

(56) References Cited

U.S. PATENT DOCUMENTS

| 5,758,359 | A * | 5/1998 | Saxon ......................... 707/204 |
| 5,937,163 | A * | 8/1999 | Lee et al. ..................... 709/218 |
| 6,601,058 | B2 * | 7/2003 | Forster et al. ................... 707/3 |
| 6,877,016 | B1 * | 4/2005 | Hart et al. ..................... 707/201 |
| 2003/0154211 | A1 * | 8/2003 | Kasahara ..................... 707/102 |
| 2003/0208511 | A1 * | 11/2003 | Earl et al. ..................... 707/204 |
| 2005/0210080 | A1 * | 9/2005 | Saika .......................... 707/204 |

FOREIGN PATENT DOCUMENTS

| JP | 04-235625 A | 8/1992 |
| JP | 05-120110 | 5/1993 |
| JP | 07-262067 | 10/1995 |
| JP | 10-031562 | 2/1998 |
| JP | 2000-163288 A | 6/2000 |
| JP | 2000-347919 | 12/2000 |

OTHER PUBLICATIONS

Japan Patent Office office action for patent application JP2002-335928 (May 20, 2008).

* cited by examiner

*Primary Examiner*—Charles Rones
*Assistant Examiner*—Alicia Lewis
(74) *Attorney, Agent, or Firm*—Townsend and Townsend and Crew LLP

(57) ABSTRACT

The amount of work processing (main processing amount) of a database is acquired and accumulated. A value (main processing index) indicating the transition of the amount of main processing amount available in a time frame that is presumed to be required for backup is calculated by using the amounts of main processing accumulated during the latest period of time. The main processing index is compared with the backup executability reference value which is a threshold value determining the backup executability. If the main processing index is smaller than the threshold value, backup is executed. If the main processing index is larger than the threshold value, backup is not executed but the amount of main processing is again acquired to calculate the main processing index, and the main processing index is compared with the backup executability reference value.

10 Claims, 10 Drawing Sheets

CONDITIONS FOR BACKUP EXECUTION

| | | |
|---|---|---|
| 501 | THE NUMBER OF MAIN PROCESSING AMOUNT ACQUISITIONS | 3 |
| 502 | BACKUP EXECUTABILITY REFERENCE VALUE | 40 |
| 503 | MAXIMUM DEFERRED PERIOD | 60 |
| 504 | ACQUISITION INTERVAL | 1 |
| 505 | PREDICTED BACKUP TIME | 20 |

CONDITIONS FOR BACKUP EXECUTION

| | | |
|---|---|---|
| 1001 | THE NUMBER OF MAIN PROCESSING AMOUNT ACQUISITIONS | — |
| 602 | BACKUP EXECUTABILITY REFERENCE VALUE | 40 |
| 603 | MAXIMUM DEFERRED PERIOD | 60 |
| 604 | ACQUISITION INTERVAL | 3 |
| 1002 | PREDICTED BACKUP TIME | — |

METHOD FOR DETERMINING EXECUTION OF BACKUP ON A DATABASE

BACKGROUND OF THE INVENTION

The present invention relates to a method for determining the execution timing of backup of a database in a database management system.

A database management system (hereinafter referred to as the "DBMS") has been utilized in a wide range of fields such as a customer management system and a commodity management system. With such DBMS which boasts excellent reliability and availability, the maintenance of data or the maintenance of operations in preparation for possible failures plays an important role. One good example of the maintenance of operations is the backup of a database.

Methods for getting the database backup include an off-line backup which is performed by shutting down the DBMS and an on-line backup which is carried out while operating the DBMS.

As the off-line backup is being carried out, in general, a plan to shut down the DBMS during an appropriate time frame, or a backup plan is prepared by a database administrator in advance. For example, for a business-oriented DBMS being used in an enterprise, the DBMS can only be shut down after the work hours. Accordingly, a presumable backup plan is to execute backup by shutting down the DBMS according to the plan after work hours on weekdays and on holidays as well. Since it is necessary to complete the backup procedures within a short period of time if they are to be carried out after work hours on weekdays, a differential backup is executed to acquire the backup only for the portion that has been updated since the previous backup. While on holidays, a full backup is executed to get the backup of the whole database since plenty of time is available in this case.

On the other hand, when the DBMS cannot be subjected to a planned shutdown due to the style of work or the usage of the DBMS, an on-line backup is utilized to achieve backup while operating the DBMS. However, the on-line backup may affect the work process which should constitute the main processing of the DBMS (hereinafter referred to as the "main processing") while executing the backup, thus causing a possible delay in the processing. Accordingly, in order to perform backup without inducing any delay in the main processing even during the on-line backup, it is necessary to prepare a backup plan which executes backup during a time frame in which an amount of main processing of a database is smaller.

With the Japanese Patent Laid-open No. 2000-347919 wherein on-line backup is executed during a time frame in which the amount of main processing is smaller, the busy rate is used as an index to represent the amount of main processing. Here, the busy rate implies a rate of disk accessing time for read or write per unit time.

A processing flow of the above-stated prior art will be described by referring to FIG. 12. With the prior art stated above, it should be supposed that in a busy rate acquisition function 1208, the busy rate of a database is periodically acquired by utilizing a busy rate acquisition utility 1210, and the busy rate thus acquired is accumulated on a busy rate database 1211 in the busy rate acquisition function 1208.

In a backup execution conditions input function 1201, information including a threshold value to determine the executability of backup (backup executability reference value 1216) is input after comparing the respective busy rates of a date and time zone in which backup should be executed (backup candidate time zone 1214), time which is predicted to be necessary for backup (predicted backup time 1215), and a backup candidate time zone.

Then, in a busy rate extraction function 1212, under the assumption that work has periodicity and the busy rate of a database changes in a cycle, busy rates that have been accumulated in a busy rate database 1211 are extracted. In the above-stated prior art, a description is made by quoting an example wherein the cycle is presumed to be one year, and a busy rate 1217 during a backup candidate time zone on the same day, same week and same month of previous year is extracted.

Next, in a backup execution timing determining function 1204, a time zone where the busy rate is sufficiently small, namely, a time zone in which a busy rate is not exceeding the backup executability reference value 1216 is searched for among the busy rates that have already extracted, and an instruction is issued to a backup execution management function 1205 to execute backup in that time zone (in the above-stated prior art, such instruction information is called the backup execution plan). In the above-stated prior art, considering a case where a time zone in which a busy rate is not exceeding the backup executability reference value 1216 cannot be found, a method for increasing the value of the backup executability reference value 1216, and searching for a time zone in which a busy rate is not exceeding the backup executability reference value 1216 again. With the example shown in FIG. 12, since the value 20 of the busy rate during 1:00 to 2:00, among busy rates 1217 during backup candidate time zone on the same day, same week and same month of previous year, is smaller than 30 of the backup executability reference value 1216 which should be the backup conditions, a backup execution plan is prepared so that backup may be executed within the time zone, judging that the busy rate is sufficiently small.

The backup execution management function 1205 manages a backup execution plan created in a backup execution plan creating function 1202, and executes a backup execution utility 1206 when the time zone determined by above-stated backup execution time frame determining function 1204 is reached.

A method for determining a backup time frame according to the above-stated prior art will be described by referring to FIG. 13. With the example shown in FIG. 13, it shall be presumed that the busy rate changes at a one-year cycle as described in the above. In the graph shown in FIG. 13, the vertical axis indicates busy rate, while the horizontal axis indicates time. In the busy rate extraction function 1203 shown in FIG. 13, a busy rate 1301 on the same day, same week and same month of previous year (t1' to t2') is extracted, under the presumption that such busy rate has a one-year cycle, and then the busy rate is applied as an assessed value of the busy rate 1302 for the backup candidate time zone 1214 (t1 to t2). In the backup execution timing determining function 1204 shown in FIG. 12, an interval in which any busy rate among the busy rates in the backup candidate time zone (t1 to t2) 1214 extracted in the above, more specifically, an interval in which the busy rate is not exceeding the backup executability reference value 1216, is searched for, and the time zone is determined as a backup execution time zone 1303.

However, in recent years, the style of usage of the DBMS has been changing, and accordingly, such DBMS to be used by general people as those connected to the Internet have increased in number, in addition to such DBMS installed within an enterprise that is only used by limited persons. In addition, there is such DBMS that accepts accesses not only from domestic users, but also from overseas users, and with those cases, the amount of main processing will not always change periodically.

Under such a situation, the method for determining backup time frame on the assumption of periodical changes in the amount of main processing as is the case of above-stated prior art cannot be applied. Even if such method is applied, there is a possibility that the actual main processing amount of the DBMS can not be obtained at the presumed predetermined time, and therefore, backup may be carried out at a time when the amount of main processing is large. As a result, the frequency of the main processing may increase during the execution of an on-line backup, thus causing adverse affects in the main processing of the DBMS such as a delay.

Accordingly, to prevent adverse affects such as a delay during an on-line backup of the DBMS, it is necessary to acquire backup during a time zone in which the main processing of the DBMS is not affected.

SUMMARY OF THE INVENTION

The object of the present invention is to determine execution of on-line backup so as to reduce adverse affects on main processing by the on-line backup even in a case where changes in an amount of processing of the DBMS is not periodical.

A method for determining execution of backup to achieve the above-stated object will be described in the following.

According to the present invention, a point of time when the amount of a work processing which should be the core of the DBMS (the amount of main processing) is small is determined to execute backup. Here, the amount of main processing specifically includes a busy rate of a disk, and an amount of transaction per unit time of a database.

Since backup is not executed momentarily, a main processing index is used as an index to determine whether a period of time which is assumed to be needed for the backup is long or short. The main processing index is a value obtained such that changes in the amount of main processing during the time frame estimatingly required for backup of a database is estimated from some amounts of main processing and the magnitude of the main processing during the time frame is to be represented by the single value, such as a maximum value or an average value thereof. To calculate a main processing index, the amount of main processing of a database is first obtained, and then an approximate expression for changes in the amount of main processing is derived from the amount of main processing thus obtained. Such approximate expression could conceivably be a linearized approximation, or an approximation using a quadratic or a cubic curve. In addition to an approximate expression, a maximum value or an average value can be used. Next, from the approximate expression thus obtained, the maximum value or the average value of the amount of main processing during the backup time is calculated or determined as the main processing index. Another possible method is that, from the amount of main processing obtained from the database, the maximum value or the average value is obtained directly from the amount of main processing obtained from the database. In addition to the above-stated methods, an index to determine the volume of the amount of main processing during the time frame estimatingly needed for backup may be used as the main processing index.

With the above-described prior art, a backup execution timing is determined by referring to the amount of past main processing, under the assumption that the amount of main processing of a database should change periodically. However, with the present invention, even in a case where the amount of main processing of a database does not change periodically, the backup executability is determined by judging the load of the amount of main processing at that time on the basis of the main processing index.

According to the present invention, since the last amount of main processing of a database is obtained and backup is executed by predicting changes in the amount of main processing from the determining point in time, it is possible to determine execution of on-line backup in the manner to avoid a time frame when the amount of main processing is large, and reduce adverse affects of the on-line backup on the main processing, even in the case where changes in the amount of main processing is not periodical.

DESCRIPTION OF THE PREFERRED EMBODIMENT

Figure 1:
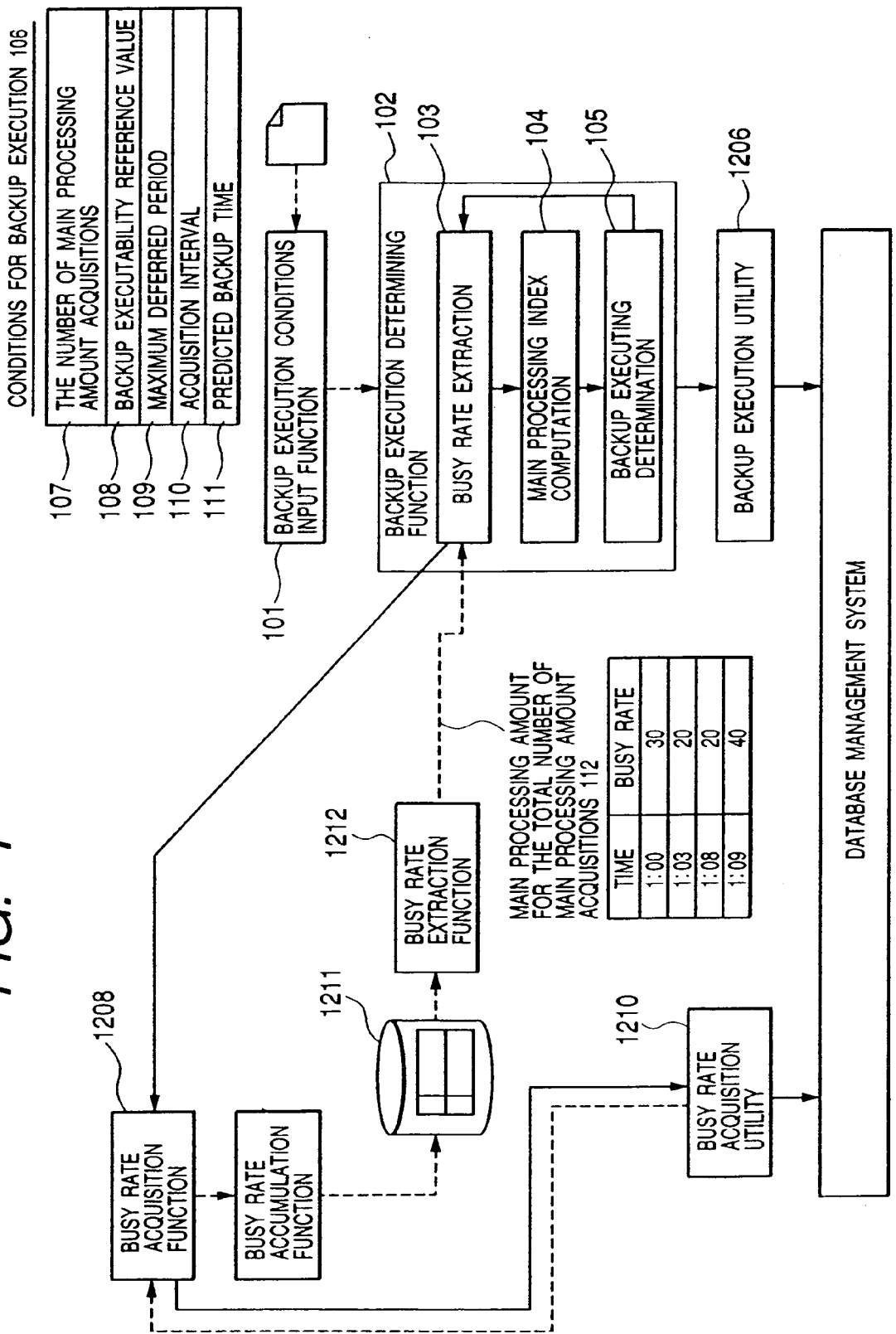
FIG. 1 is a diagram showing a processing flow of a method for determining execution of backup according to the present invention.

To begin with, the principle of the present invention will be described. The present invention determines, at a certain random time, the size of an amount of work processing which should be the core of the DBMS (hereinafter referred to as the amount of main processing), and executes backup if the amount of main processing is small. A busy rate which is a rate of a disk access time for read/write of a disk per unit of time, or an amount of transaction of a database can be used as an index to measure the size of the amount of main processing. Factors other than the above may be used if they should constitute values representing the amount of main processing. Here, since backup will not be finished momentarily, it is desirable that the amount of main processing should remain small during backup. Therefore, an index used to presume the size of the amount of main processing from moment to moment is mandatory. Hereinafter, such an index shall be called the main processing index.

The main processing index is a value obtained such that changes in the amount of main processing during the time frame estimatingly required for backup of a database is estimated from some amounts of main processing and the magnitude of the main processing during the time frame is to be represented by the single value, such as a maximum value or an average value thereof. To calculate a main processing index, the amount of main processing of a database is first obtained, and then an approximate expression for changes in the amount of main processing is derived from the amount of main processing thus obtained. Such approximate expression could conceivably be a linearized approximation, or an approximation using a quadratic or a cubic curve. In addition to an approximate expression, a maximum value or an average value can be used. Next, from the approximate expression thus obtained, the maximum value or the average value of the amount of main processing during the backup time is calculated or determined as the main processing index. Another possible method is that, from the amount of main processing obtained from the database, the maximum value or the average value is obtained directly from the amount of main processing obtained from the database. In addition to the above-stated methods, an index to determine the volume of the amount of main processing during the time frame estimatingly needed for backup may be used as the main processing index.

Methods for calculating an average value of the amounts of main processing in the predicted backup time zone may include the calculation of an average value of the amounts of main processing for the acquisition number of the amounts of main processing. Those indices other than the above may be used if they can indicate changes in the amount of main processing during backup.

Next, a comparison is made between the main processing index and a preset threshold value (backup executability reference value). As a result of the comparison, if the main processing index is equal to the backup executability reference value or smaller, backup is executed, judging that the effect on the amount of main processing during the backup is small.

Processing procedures according to the present invention will be described by referring to FIG. 1. Here, the description is made by using the busy rate of a disk as the amount of main processing. With the present invention, when a function according to the present invention is initiated by a database administrator or a scheduler application, first, in a backup execution conditions input function 101, a parameter (conditions for backup execution 106) that is used to determine the execution of backup is input. The conditions for backup execution 106 includes a backup executability reference value 108 which is a threshold value to determine the executability of the backup, and a predicted backup time 111 which is a predicted time required for the backup.

Next, a backup execution determining function 102 is initiated to extract, in busy rate extraction 103, a busy rate required for calculating the main processing index from a busy rate database 1211. Then, the main processing index is calculated based on the busy rate extracted in main processing index computation 104, and, in backup execution determining processing 105, if the main processing index is equal to the backup executability reference value or smaller, the backup is determined to be executable, thus exiting the backup execution determining function.

According to the present invention, the number of times to acquire the amount of main processing can be changed by incorporating the number of acquisition times of busy rate that is used to calculate the main processing index in the number of main processing amount acquisitions 107 which is a parameter to be input to the conditions for backup execution. Increasing the value of the number of main processing amount acquisitions 107 will improve the accuracy of the main processing index.

In addition, in a similar way, an interval to acquire the amount of main processing can be changed by incorporating an acquisition interval 110 in the parameter which is used to input an interval to acquire the amount of main processing in the conditions for backup. When the acquisition interval is too short, the load of acquiring the processing amount may increase for the main processing, but by providing an arrangement which enables the variable setting of the acquisition interval, the value can be adjusted to be adequate in accordance with the usage style or the operation method of the DBMS.

In FIG. 1, the busy rate acquisition function 1208 adapted to acquire the busy rate of a database is initiated by backup execution determining function 102 after inputting conditions for backup execution, and acquires the busy rate designated by the number of main processing amount acquisitions 107. Then, such busy rate is accumulated in the busy rate database 1211 by the busy rate acquisition function 1208. However, alternatively, the busy rate acquisition function 1208 may be initiated independent of the backup execution determining function 102 to accumulate the busy rate in the busy rate database 1211 in advance, and the busy rate extraction function 1212 may provide the main processing amount 112 to the backup execution determining function 102.

According to the present invention, since backup will not be executed unless the main processing index becomes equal to the backup executability reference value 108 or less, there may be a case where the backup cannot be executed forever. Possible solutions for dealing with such case could conceivably include a method for providing a maximum deferred period 109 in the conditions for backup execution 106. If it is determined that backup will not be completed even after the maximum deferred period 109 has elapsed since the initiation of the backup execution determining function 102, or more specifically, when the present time has passed the "(start time of the backup execution determining function + the maximum deferred period)−the predicted backup time", the backup will be initiated irrespective of the result of comparison between the main processing index and the backup executability reference value 108.

Figure 2:
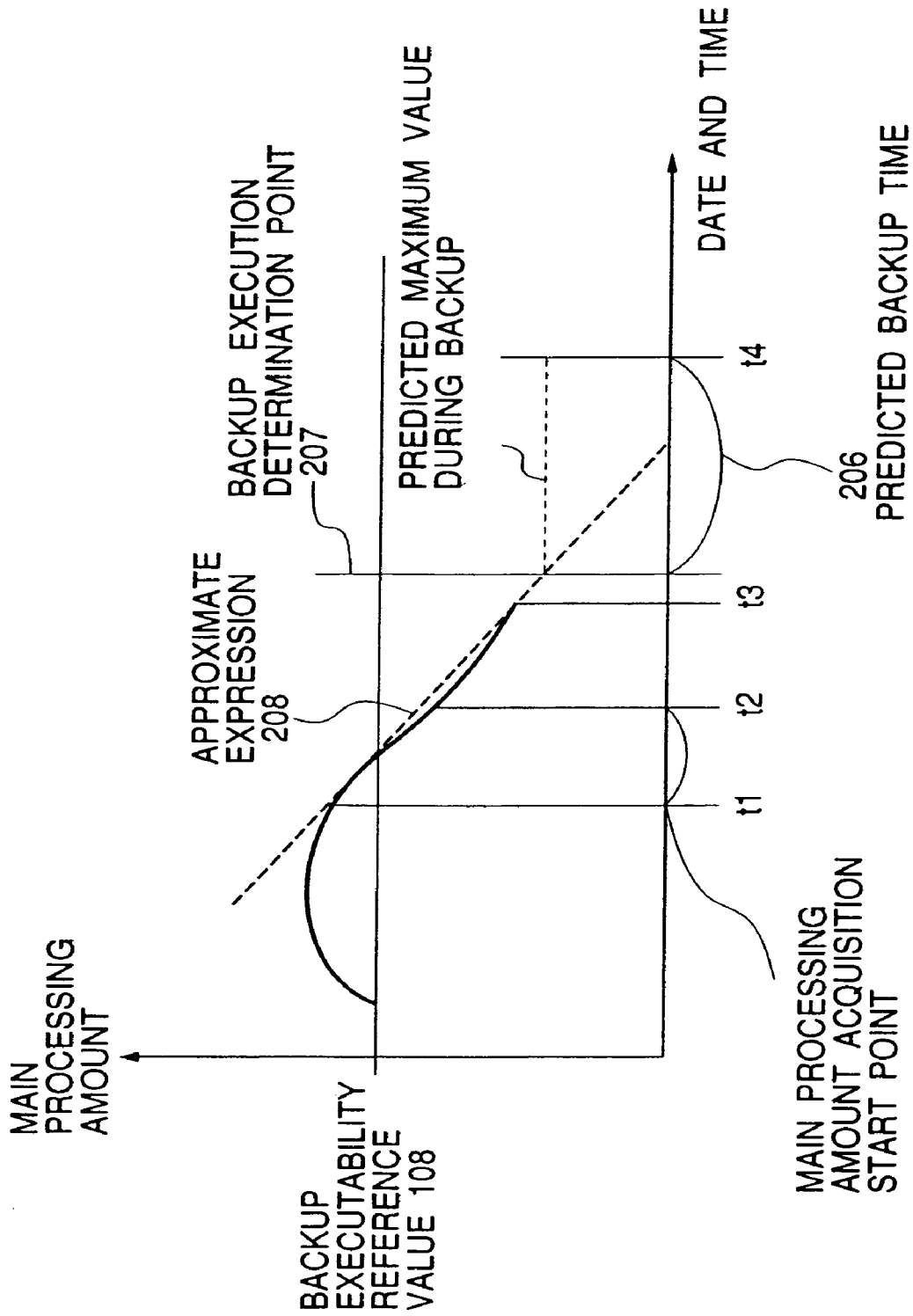
FIG. 2 is a diagram showing the principle of the method for determining execution of backup according to the present invention.

FIG. 2 is a diagram describing the principle of main processing amount calculation according to the present invention. With the present invention, the amount of main processing which is necessary for the calculation of the main processing index is acquired before a point in time 207 when it is determined whether or not to execute backup (points in time t1, t2 and t3 as shown in FIG. 2). At a point in time of the backup execution determination 207, the main processing index is calculated based on the pre-acquired amount of main processing. In the example shown in FIG. 2, an approximate expression 208 for the amount of main processing shall be calculated from t1 to t3, and the maximum value of the main processing amount during a predicted backup time 206 shall be the main processing index. The main processing index thus calculated is compared with the backup executability reference value 108, and if the main processing index is equal to the backup executability reference value 108 or smaller, backup will be executed.

Hereinafter, a first preferred embodiment according to the present invention will be described.

In the first embodiment, the amount of main processing of a database is acquired and the main processing index is calculated. Thereafter, the main processing index is compared with the backup executability reference value 108 to determine execution of backup. For the main processing index, an approximate expression is obtained based on the amount of main processing obtained in the above, and then, the maximum value of the amount of main processing during the predicted backup time is calculated by using the approximate expression.

Figure 3:
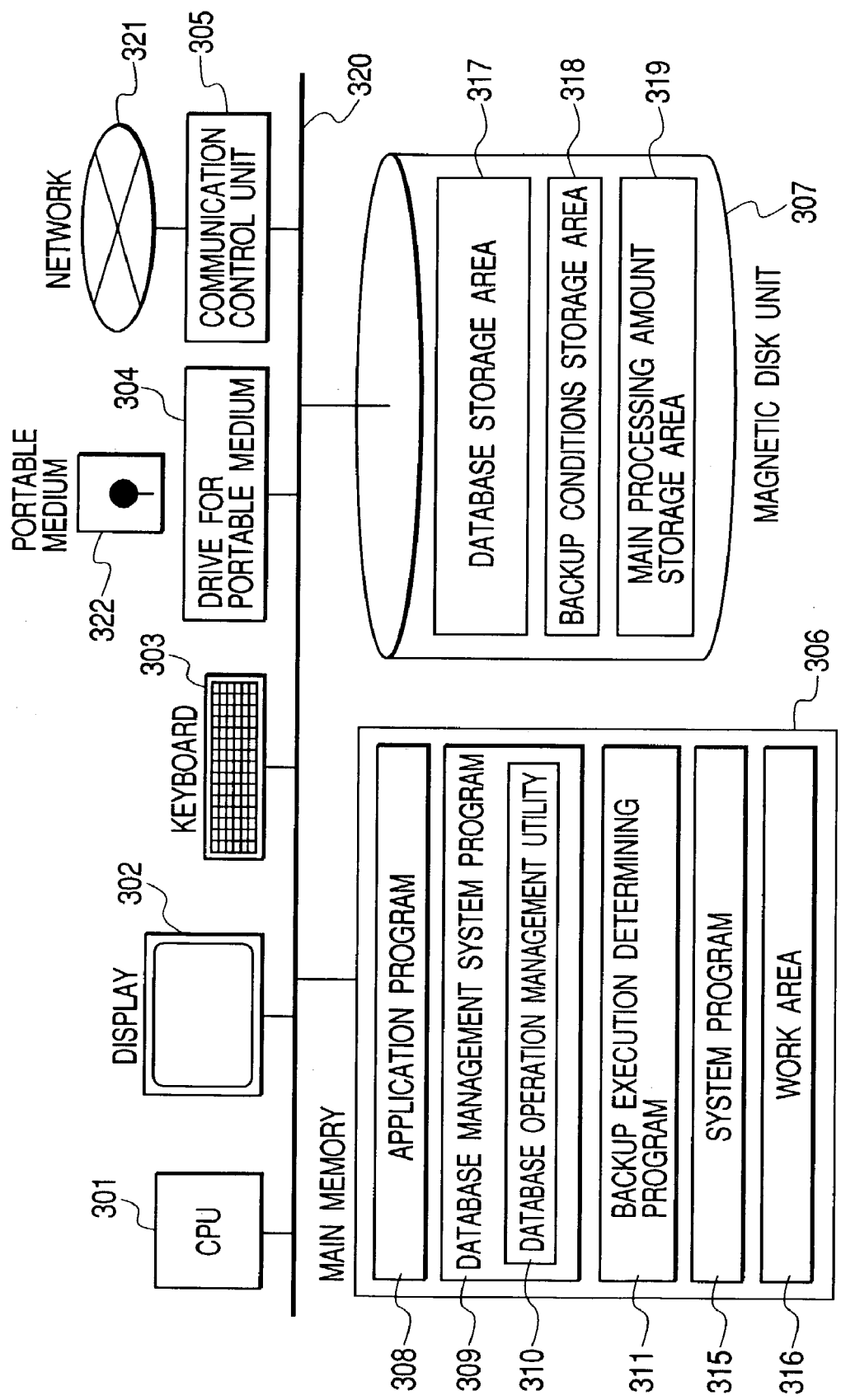
FIG. 3 is a diagram showing a system configuration according to a first embodiment.

FIG. 3 shows a system configuration according to the first embodiment. The present invention is applicable to a general computing system comprising a central processing unit (CPU) 301, a display 302, a keyboard 303, a drive for portable medium 304, a communication control unit 305, a main memory 306, a magnetic disk unit 307 and a system bus 320.

The CPU 301 executes various programs used in the present invention. The display 302 is used to display the execution status, the execution result, etc. of processing. The keyboard 303 is used to input commands to instruct the execution of the database control system, etc. The drive for portable medium 304 is used to write and read data to, and from portable medium 322 such as a floppy (R) disk, a magnet-optical disk, and a write-once-read-many magnet-optical disk. The communication control unit 305 is used for communication via a network 321. The main memory 306 is used to store various programs to be used in the present invention and temporarily store data. The magnetic disk unit 307 is used to store databases and definition information related to such databases. The system bus 320 is used to connect the above-stated devices.

The magnetic disk unit 307 keeps a database storage area 317, a backup conditions storage area 318 and a main processing amount storage area 319.

The main memory 306 holds an application program 308, a database control system program 309, a backup execution determining program 311, a system program 315 and a work area 316.

In addition, the database control system program 309 includes a database operation management utility 310 which conducts backup or status analysis of a database.

The application program 308 provides users with services by using the database control system program 309. The database control system program 309 executes operations and control of a database.

Figures 5, 7:
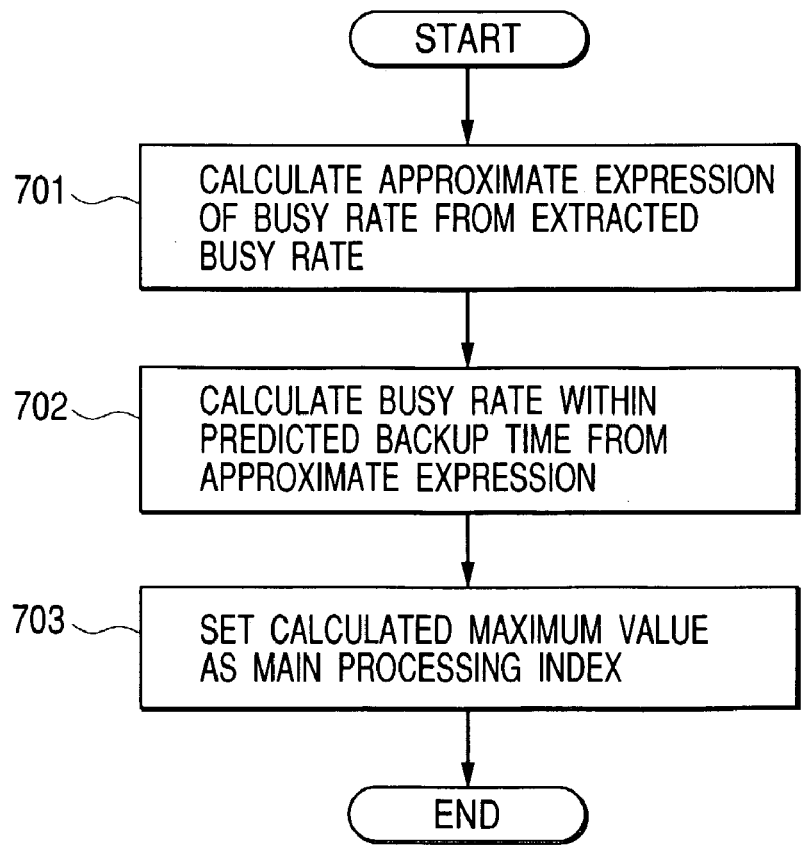
FIG. 5 shows an example of backup execution conditions according to the first preferred embodiment.
FIG. 7 is a flow chart for obtaining a main processing index according to the first embodiment.

The backup execution determining program 311 inputs conditions for determining the backup executability as shown in FIG. 5, and determines the execution of backup based on the amount of main processing.

The system program 315 provides basic functions to execute various programs to be used in the present invention including outputs and inputs of data to and from peripheral equipment. In addition, the system program 315 incorporates a system clock, and retains the present date and time. The work area 316 is used to store data that are temporarily needed during the execution of a program.

The database storage area 317 is used to store a database and definition information related to the database concerned. The backup conditions storage area 318 is used to store backup conditions to be input while executing the backup execution determining program 311. The main processing amount storage area 319 stores the amount of main processing acquired while executing the backup execution determining program 311 in accordance with the time series. It should be noted, however, the backup conditions storage area 318 or the main processing amount storage area 319 may be stored in a memory or an ordinary file, not in the magnetic disk unit 307.

A program to be used in the present invention is installed in the main memory 306 via the portable medium 322 or the network 321. However, it should be noted that, in the case where the portable medium 322 is used, the program shall be pre-stored in the portable medium 322.

FIG. 5 shows an example of parameters input to the backup execution determining program 311. Hereinafter, details of the parameters to be input will be shown. The number of main processing amount acquisitions 501 specifies acquisition times of the amount of main processing to calculate the main processing index. The example shown in FIG. 5 exemplifies that the main processing amount is acquired three times in advance to calculate the main processing index. A backup executability reference value 502 is a threshold value used for the comparison with the main processing index to determine the backup executability. FIG. 5 shows a case of specifying a sufficiently small amount of main processing to execute backup, and shows that, for example, with an assumption that the busy rate is used as the amount of main processing, the threshold value has been set in the manner that the backup is determined to be executable if the busy rate is 40% or less.

A maximum deferred period 503 sets a deferred period during which the backup execution determination is continued. As a result of comparison between the backup executability reference value 502 and the main processing index, if the main processing index is equal to the backup executability reference value 502 or larger and therefore the backup execution is determined to be impossible, another comparison is conducted with the acquisition of amount of main processing, the calculation of the main processing index and the backup executability reference value, respectively. However, it may be possible that the main processing index will not be smaller than the backup executability reference value 502, and therefore the backup may not be executed for a long period of time. To address such problem, it will be so arranged that the maximum deferred period is prepared in advance. With such arrangement, after the backup execution determining program is initiated, if it is determined that backup will not be completed after the maximum deferred period 503 has elapsed, or more specifically, when the present time has passed the "(start time of the backup execution determining function + the maximum deferred period)–the predicted backup time", the backup will be initiated irrespective of the result of comparison between the main processing index and the backup executability reference value 502. The example shown in FIG. 5 shows that it has been so arranged that the backup execution is initiated irrespective of the result of comparison between the main processing index and the backup executability reference value 502, if backup will not be completed after 60 minutes has elapsed since the initiation of the backup execution determining program, that is, if 40 minutes or longer has elapsed since the determination of backup because the predicted backup time is set at 20 minutes.

The acquisition interval 504 sets the interval to acquire the amount of main processing. The example in FIG. 5 shows that the amount of main processing is determined to acquire every one-minute. A predicted backup time 505 is a predicted value of time required to backup a database. The example in FIG. 5 shows that 20 minutes has been set for the predicted value of time required for database backup. The prediction of backup may be, for example, automatically set by the system by memorizing the period of time required for the previous backup.

Figure 6:
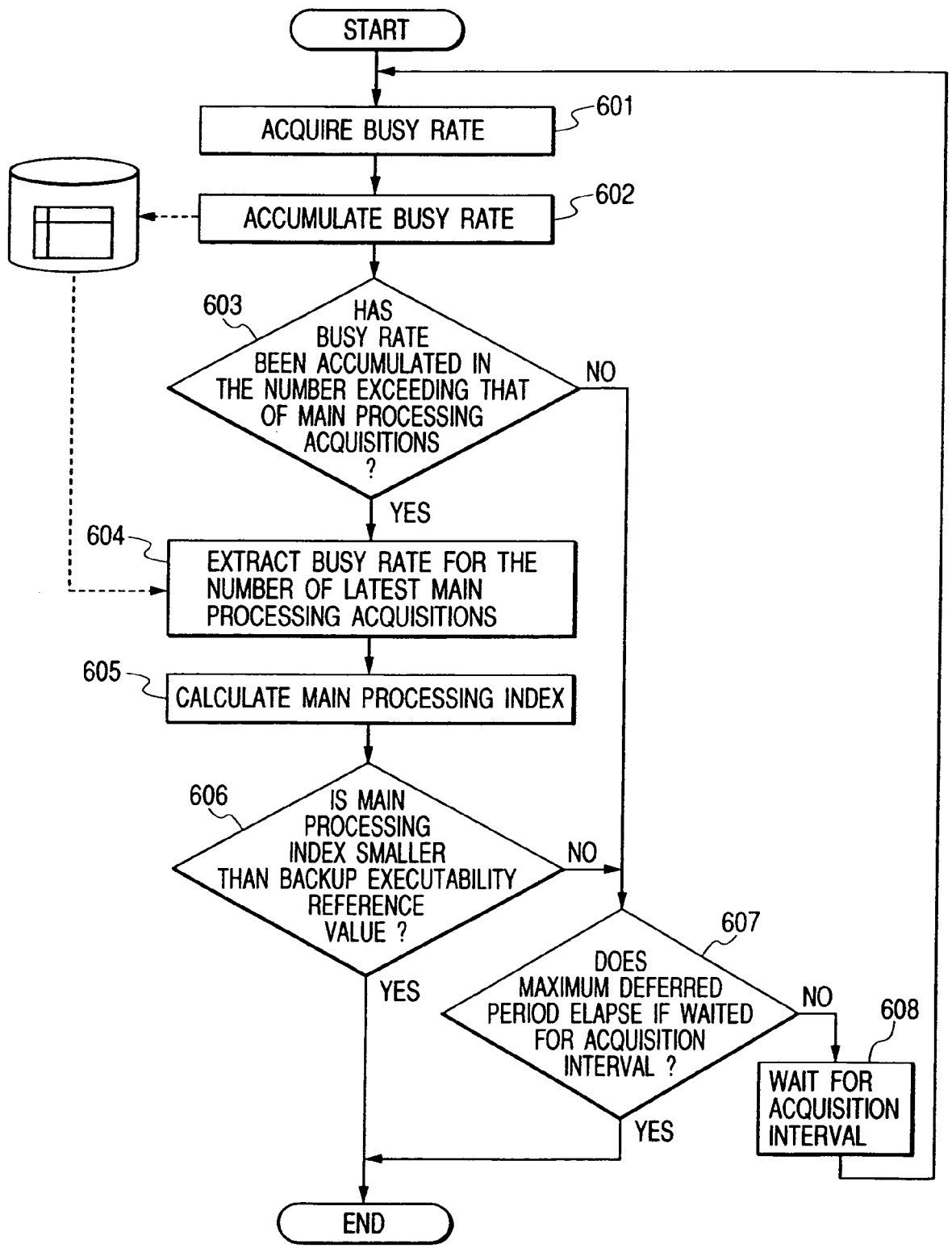
FIG. 6 is a flow chart illustrating a method for determining execution of backup according to the first invention.
Figure 8:
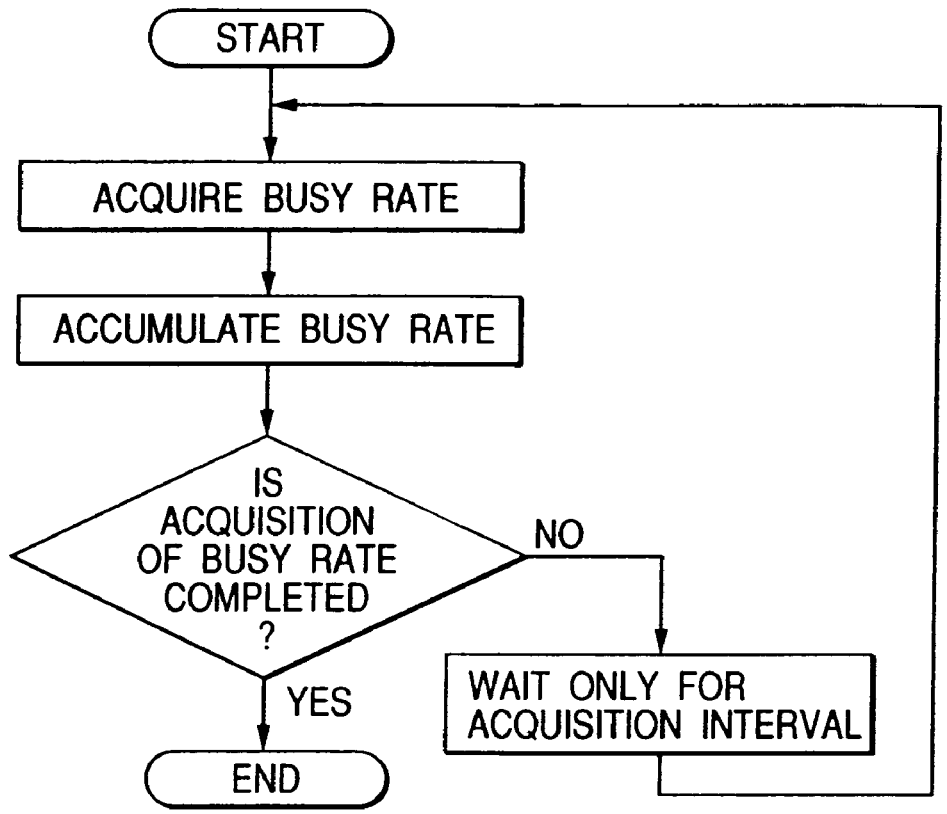
FIG. 8 is a flow chart of a processing program to obtain a busy rate according to the first preferred embodiment.

FIG. 6 is a process flow chart of the backup execution determining program 311 according to the first embodiment.

With the first embodiment, a busy rate of disk (hereinafter simply referred to as the busy rate) is used as a means of expressing the amount of main processing. Here, the busy rate implies a rate of disk accessing time for read or writes per unit time.

In the prior art, it is arranged to search for a time zone in which the amount of main processing is smaller than the backup executability reference value out of the amount of main processing acquired for each day or each time zone, by comparing all amount of main processing and backup executability reference values available in the predicted backup time. On the other hand, with the present invention, a main processing index which expresses the size of main processing in backup based on the acquired amount of main processing, and then the main processing index is compared with the backup executability reference value to determine the backup executability. More specifically, the amount of main processing during the backup time is predicted based on the main processing amount of a database in operation to determine the backup executability.

The backup execution determining program 311 shown in FIG. 6 will be periodically initiated according to a backup plan specified by a database administrator, or it will be initiated as required. The program will be executed after the backup conditions shown in FIG. 5 are set to be input. The program acquires the present busy rate in step 601 and stores the busy rate thus acquired in step 602. In step 603, it is determined that the busy rate has been acquired more than the number of main processing amount acquisitions 501 since the flow is initiated. If the busy rate has been acquired more than the number of main processing amount, the process will advance to step 604, and if not, the process will advance to step 607. In step 604, the latest busy rate is extracted in the number that is specified by the number of main processing amount acquisitions 501 based on busy rates accumulated in step 602. In step 605, the main processing index is calculated based on busy rates accumulated in step 602.

Details of step 605 to calculate the main processing index will be shown in FIG. 7. In step 701, an approximate expression for changes in the busy rate is calculated based on the acquired busy rates. Using the approximate expression obtained in step 702, the maximum value of busy rates available during the period of time between the present time and the predicted backup time 505 is calculated. In step 703, the value thus obtained is set as the main processing index. When a linear approximate expression is used as shown in FIG. 2, the maximum values of main processing across the end points of the predicted backup time can be used. For a case of approximation by using a quadratic or a cubic curve, it is necessary to calculate the maximum value within the predicted backup time. Such maximum values can be calculated by using general mathematical methods.

In step 606, the main processing index is compared with the backup executability reference value 502 that is specified in the backup conditions, and if the main processing index is equal to or smaller than the backup executability reference value 502, the flow is terminated and backup is executed. While, if the main processing index is larger than the backup executability reference value 502, the process advances to step 607. In step 607, it is determined whether or not backup will be completed before reaching the maximum deferred time 503, if waited only for the acquisition interval 504 which is specified in the backup conditions. Judgment on whether or not backup is completed is conducted whether or not the maximum deferred time will be elapsed if the predicted backup time has passed over the present time. If the maximum deferred time 503 is passed over, backup will be executed regardless of the comparison result in step 606. In the case where the maximum deferred time 503 is not passed over, waiting is made by the acquisition interval 504 in step 608, and the process returns to step 601.

FIG. 6 shows a method for acquiring the busy rate within the backup execution determining program 311. However, instead of the acquisition and the accumulation of the busy rate as are respectively performed in steps 601 and 602, the acquisition and the accumulation of the busy rate may be performed independently of the backup execution determining program 311, by separately creating a program to perform a processing to acquire the busy rate.

Incidentally, although an approximate expression for the busy rate acquired is herein used for calculating the main processing index, statistical methods in which the maximum value among the amounts of main processing acquired is designated to be the main processing index may be used.

The result of the backup executability determination obtained through the backup execution judgment method of a database according to the present invention is displayed on the display 302 shown in FIG. 3. At this time, by concurrently displaying the graph shown in FIG. 2., it becomes possible to present to users related information which can be a ground for the backup executability determination. In addition, if the result obtained shows that the backup is not executable, it is possible to choose an adequate backup time frame by re-setting the conditions for backup execution 106 by using the keyboard 303 shown in FIG. 3 to implement the method according to the present invention.

According to the first embodiment, even in the case where changes in the amount of main processing of a database is not periodical, backup can be executed in a time frame in which the main processing of a database will be least liable to be affected, avoiding other time frames in which much more amounts of main processing are available.

Next, a second preferred embodiment according to the present invention will be described. In the second embodiment, amounts of main processing of a database are acquired before calculating a main processing index. Thereafter, a comparison is made between the main processing index and a backup executability reference value to perform backup execution determination. An average value of the amounts of main processing acquired is calculated for the main processing index.

Figure 4:
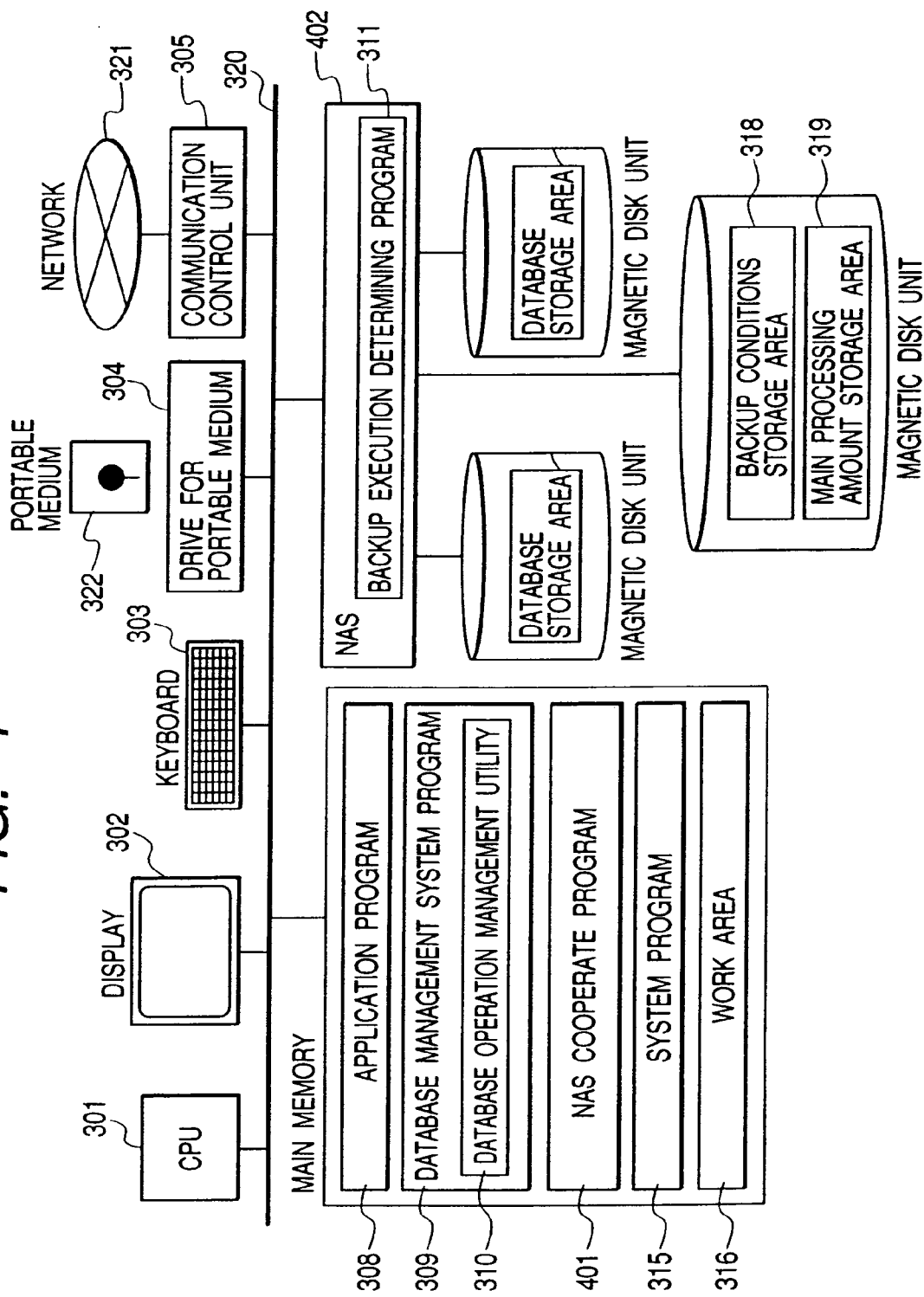
FIG. 4 is a diagram showing another system configuration according to the first embodiment.

The system configuration is the same as that shown in FIG. 4. A parameter to input conditions for backup execution as well as a backup execution determining function are the same as those described in FIG. 6 for the first embodiment.

Figure 9:
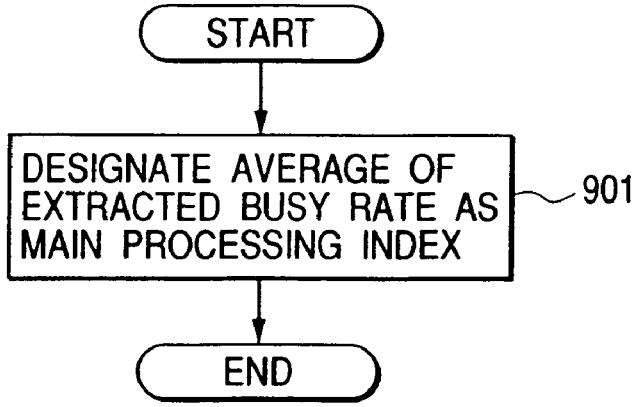
FIG. 9 is a flow chart for obtaining a main processing index according to a second preferred embodiment.

In the second embodiment, step 605 to calculate the main processing index in the backup execution determining function shown in FIG. 6 is modified to step 901 shown in FIG. 9, wherein an average value of busy rates in the number of main processing acquisitions including the latest acquisition thereof is applied to the main processing index. For example, if the busy rates acquired are 40, 50 and 30 respectively, the average value of these three busy rates, that is 40, is used as the main processing index.

According to the second embodiment, even in the case where changes in the amount of main processing of a database is not periodical, backup can be executed in a time frame in which the main processing of a database will be least liable to be affected, avoiding other time frames in which much more main processing amounts are available. That is because a time zone which provides less load on the database can be determined as a time frame which is more appropriate than that for the first embodiment.

Hereinafter, a third preferred embodiment will be described. In the third embodiment, amounts of main processing of a database are acquired before calculating a main processing index, and then, a comparison is made between the main processing index and a backup executability reference value to perform backup execution determination. The main processing amounts acquired as they are used as the main processing index.

The system configuration according to the third embodiment is the same as that shown in FIG. 4. In the third embodiment, the conditions for backup execution shown in FIG. 10 shall be set to be input. Parameters of the conditions for backup execution do not include the number of main processing acquisitions 1001 and a predicted backup time 1002, but the other parameters of the conditions for backup execution are the same as those shown in FIG. 6.

Figures 10, 11:
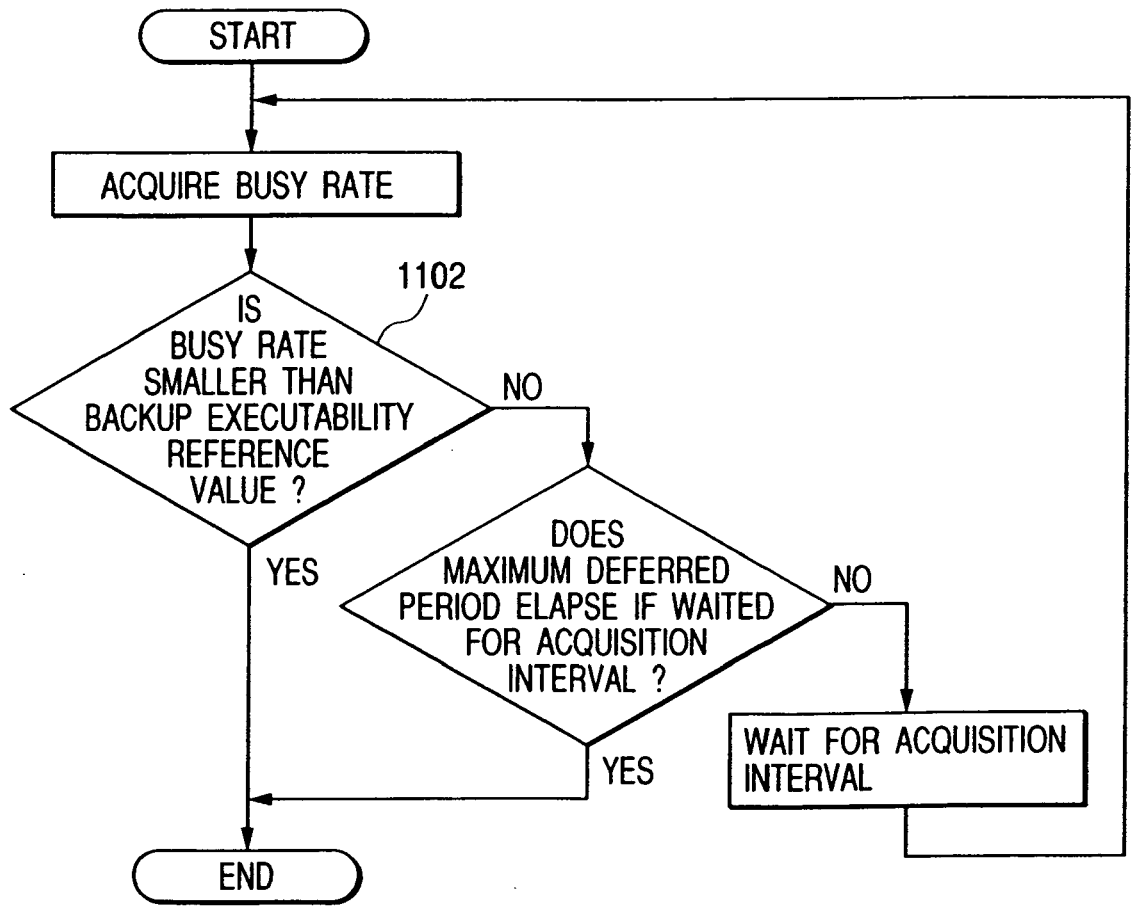
FIG. 10 shows an example of backup execution conditions according to a third preferred embodiment.
FIG. 11 is a flow chart of a method for determining execution of backup according to the third preferred embodiment.
Figure 12:
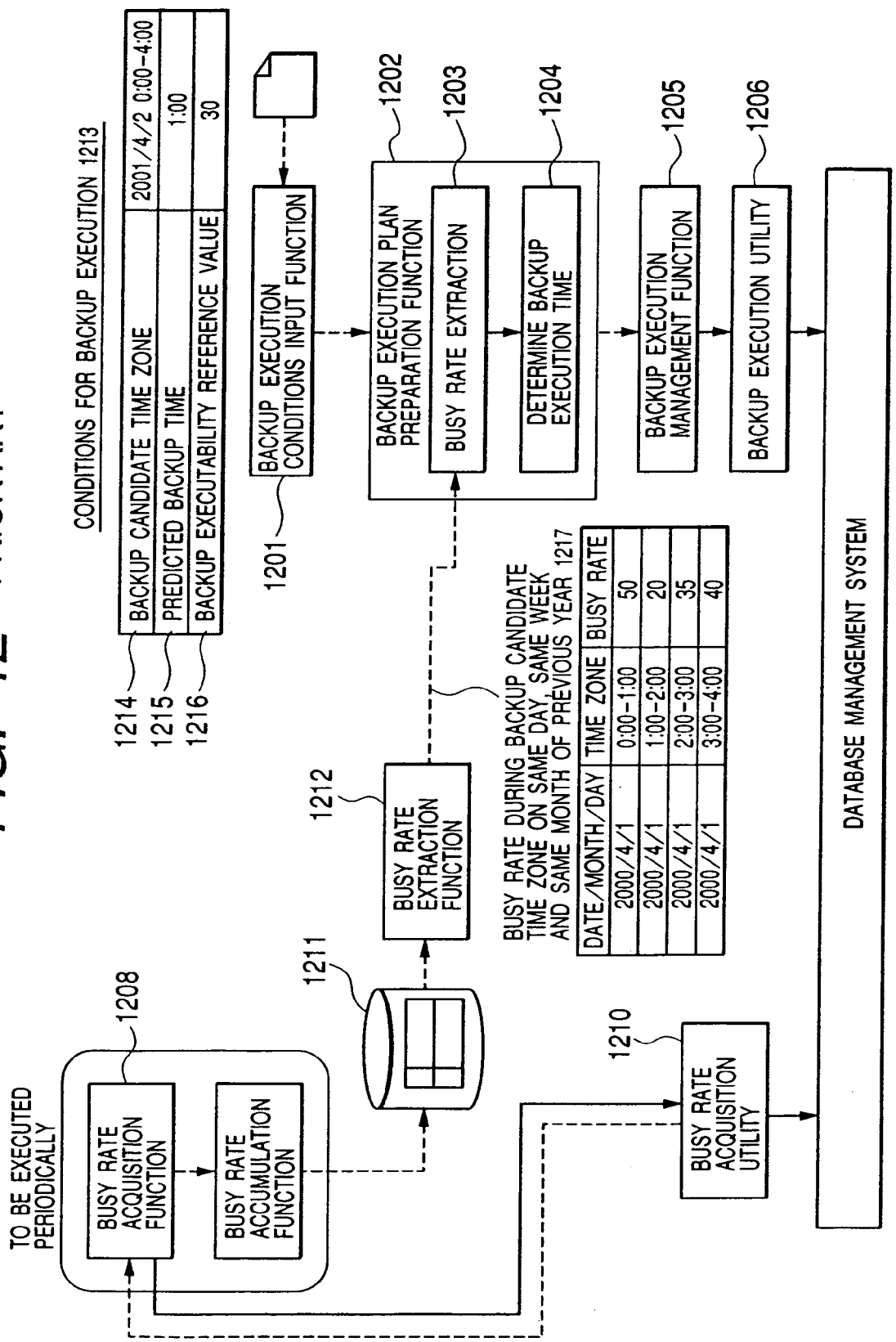
FIG. 12 is ad diagram showing a prior art processing flow.
Figure 13:
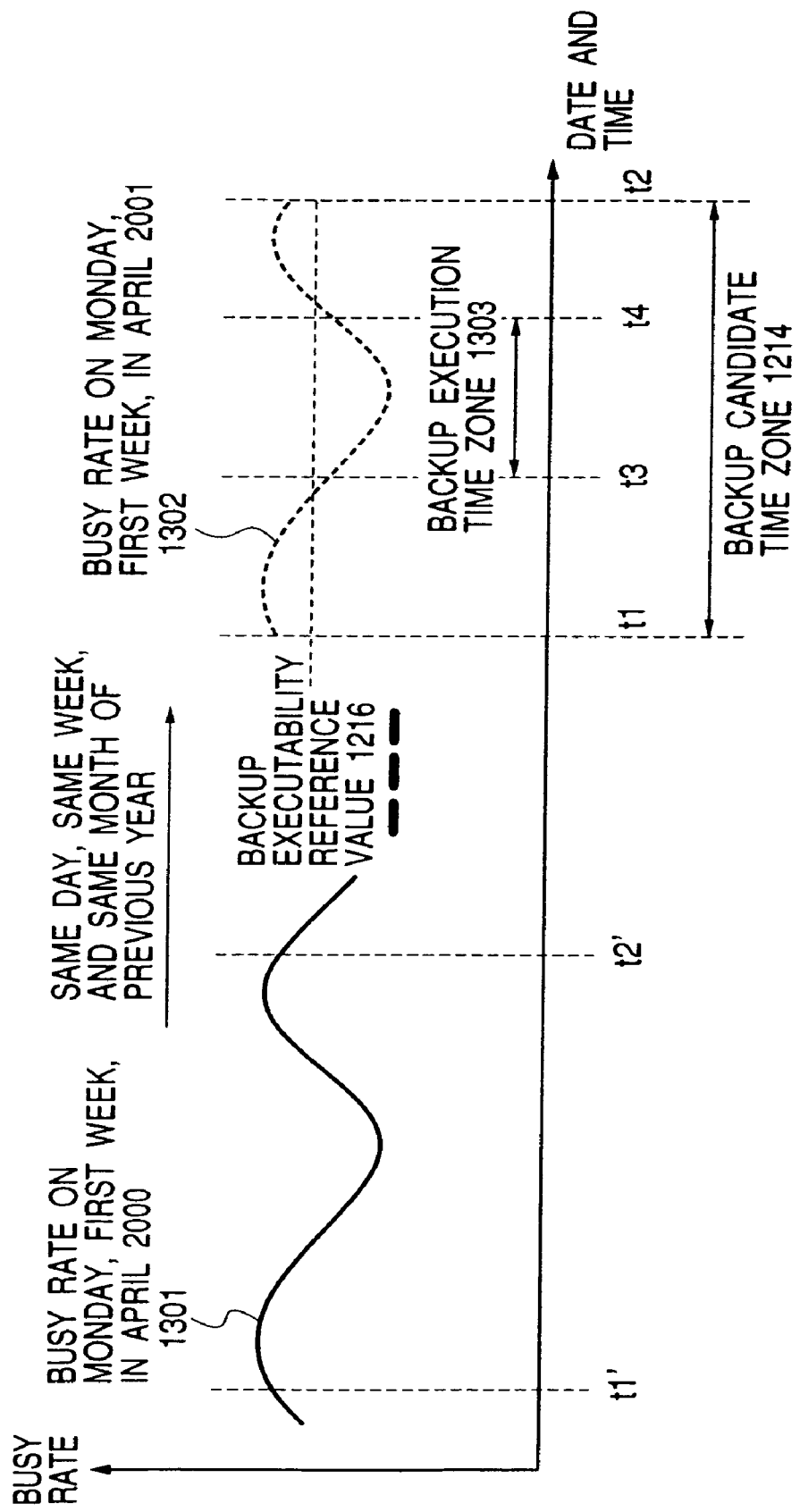
FIG. 13 is a diagram showing a prior art method for determining a backup time.

Since the third embodiment is arranged in such a manner as to acquire the amounts of main processing, steps 602 to 604 shown in FIG. 6 are not required as shown in FIG. 11. In the third embodiment, since conditions for backup execution shown in FIG. 10 are input, and a busy rate acquired as the main processing index is applied as it is, step 605 is not necessary as well, and therefore, the busy rate is used as it is in step 1102. These are points that are different from the first and the second embodiment.

According to the third embodiment, since a time zone which provides less load on the database can be determined by using an easier method than that of the first and the second embodiment, avoiding other time zones in which much more amounts of main processing are available, even in the case where changes in the main processing amount of a database is not periodical, backup can be executed in a time zone in which the main processing of the database will be least liable to be affected.

FIG. 4 shows a configuration which is different from the system configuration shown in FIG. 3 for the first embodiment. In the configuration shown in FIG. 4, all magnetic disk units 307 are controlled by an exclusive file server (NAS: Network Attached Storage) which is used by directly connecting to a network directly coupled to a system bus 320. In FIG. 3, processing that is executed by the backup execution automatic determining program 311 on the main memory is executed within an NAS 402. In this case, an NAS-linked program 401 is required to achieve linkage with the NAS 402. In addition, the configuration shown in FIG. 5 can also be applied to the second and the third embodiment.

In the backup execution determining method according to the present invention, backup can be executed in a time frame in which the main processing of the database will be least liable to be affected, avoiding other time frames in which much more main processing amounts are available even in the case where changes in the amounts of main processing of a database is not periodical, by performing the execution determination based on the amounts of main processing of the present database.

What is claimed is:

1. A method performed by computer instructions recorded on a computer readable medium for determining execution of backup of a database in a database management system comprising:

receiving a preset threshold value representing an acceptable condition for a processing amount for executing the backup;

calculating a predicted processing value representing an amount of processing in a time frame required for the backup, said predicted processing value based at least in part on a real-time approximate expression derived from received amounts of processing;

comparing said predicted processing value with said preset threshold value, and if said predicted processing value is smaller than said preset threshold value, judging that the backup is executable;

comparing said predicted processing value with said preset threshold value, and if said predicted processing value is not smaller than said preset threshold value, judging that the backup is not executable;

calculating a subsequent predicted processing value representing an amount of processing in a time frame required for the backup when the backup is judged to be not executable, said subsequent predicted processing value based at least in part on a real-time approximate expression derived from received amounts of processing; and repeating comparison of said subsequent predicted processing value with said preset threshold value until the backup is judged to be executable.

2. The method for determining execution of backup of a database according to claim 1, wherein a time limit to execute the backup is received as an input condition and, if said time limit is reached before said predicted processing value is found to be smaller than said threshold value, performing backup of said amount of processing.

3. The method for determining execution of backup of a database according to claim 1, wherein a maximum processing value is determined by calculating an approximate expression derived from most recent amounts of processing acquired.

4. The method for determining execution of backup on a database according to claim 1, wherein said predicted processing value is determined based on a statistical computation including an average or a maximum value of most recent amounts of processing acquired.

5. The method for determining execution of backup on a database according to claim 1, wherein a busy rate of disk, which is a ratio of disk access time for reading/writing in a unit time, is used as said amount of processing.

6. The method for determining execution of backup on a database according to claim 1, wherein an amount of transaction with a database is used as said amount of processing.

7. The method for determining execution of backup on a database according to claim 1, wherein the amount of processing to backup is determined based on a time frame required for the backup.

8. The method for determining execution of backup on a database according to claim 1, further comprising displaying a result of backup executability determination.

9. The method for determining execution of backup on a database according to claim 1, wherein a result of backup executability determination is displayed on an output means together with related information.

10. A computer readable storage medium which stores a program to execute a method for determining execution of backup of a database in a database management system, said method comprising:

receiving a preset threshold value representing an acceptable condition for a processing amount for executing the backup;

calculating a predicted processing value representing an amount of processing in a time frame required for the backup, said predicted processing value based at least in part on a real-time approximate expression derived from received amounts of processing;

comparing said predicted processing value with said preset threshold value, and if said predicted processing value is smaller than said preset threshold value, judging that the backup is executable;

comparing said predicted processing value with said preset threshold value, and if said predicted processing value is not smaller than said preset threshold value, judging that the backup is not executable;

calculating a subsequent predicted processing value representing an amount of processing in a time frame required for the backup when the backup is judged to be not executable, said subsequent predicted processing value based at least in part on a real-time approximate expression derived from received amounts of processing; and repeating comparison of said subsequent predicted processing value with said preset threshold value until the backup is judged to be executable.

* * * * *